United States Patent
Hartmann et al.

(10) Patent No.: US 9,849,918 B2
(45) Date of Patent: Dec. 26, 2017

(54) MOTOR VEHICLE BODY

(71) Applicant: GM GLOBAL TECHNOLOGY OPERATIONS LLC, Detroit, MI (US)

(72) Inventors: Jens Hartmann, Ruesselsheim (DE); Joerg Oehlmann, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/172,910

(22) Filed: Jun. 3, 2016

(65) Prior Publication Data

US 2016/0355215 A1 Dec. 8, 2016

(30) Foreign Application Priority Data

Jun. 5, 2015 (DE) .................. 10 2015 007 453

(51) Int. Cl.
*B62D 25/20* (2006.01)
*B62D 25/02* (2006.01)
*B62D 25/04* (2006.01)

(52) U.S. Cl.
CPC ....... *B62D 25/2036* (2013.01); *B62D 25/025* (2013.01); *B62D 25/04* (2013.01); *B62D 25/2045* (2013.01)

(58) Field of Classification Search
CPC B62D 25/2036; B62D 25/2045; B62D 25/04; B62D 25/025
USPC ...... 296/187.12, 187.09, 187.1, 198, 187.08, 296/209, 30, 75
See application file for complete search history.

(56) References Cited

U.S. PATENT DOCUMENTS

| | | | | |
|---|---|---|---|---|
| 5,562,329 A | * | 10/1996 | Srock | B62D 25/082 296/187.09 |
| 6,145,923 A | * | 11/2000 | Masuda | B62D 25/082 296/1.03 |
| 7,832,795 B2 | * | 11/2010 | Yokoi | B62D 25/2018 296/193.02 |
| 8,075,047 B2 | * | 12/2011 | Yamada | B62D 25/04 296/193.09 |
| 8,469,442 B1 | | 6/2013 | Pencak et al. | |

(Continued)

FOREIGN PATENT DOCUMENTS

DE 102011109349 A1 5/2012
DE 102012004681 A1 9/2013
(Continued)

OTHER PUBLICATIONS

German Patent Office, German Search Report for German Application No. 1020150074519, dated Feb. 19, 2016.
(Continued)

*Primary Examiner* — Jason S Morrow
*Assistant Examiner* — E Turner Hicks
(74) *Attorney, Agent, or Firm* — Lorenz & Kopf, LLP

(57) ABSTRACT

A motor vehicle body includes a floor structure having at least one side member, and a superstructure arranged thereon and having a hinge pillar adjoining the floor structure. A reinforcing element is provided in a transition region of floor structure and hinge pillar. A first end portion of the reinforcing element is structurally connected to the floor structure and a second end portion of the reinforcing element located opposite the first end is structurally connected to the superstructure.

17 Claims, 4 Drawing Sheets

(56) References Cited

U.S. PATENT DOCUMENTS

| | | | | |
|---|---|---|---|---|
| 8,870,267 B2* | 10/2014 | Zischke | ............. | B62D 25/2018 296/187.03 |
| 8,939,496 B2* | 1/2015 | Obayashi | ............. | B62D 21/152 296/187.08 |
| 2007/0228775 A1* | 10/2007 | Godfrey | ............... | B62D 21/155 296/187.08 |
| 2013/0200650 A1 | 8/2013 | Matsuoka et al. | | |
| 2014/0001790 A1 | 1/2014 | Zischke et al. | | |
| 2014/0091593 A1 | 4/2014 | Obayashi et al. | | |
| 2014/0232136 A1* | 8/2014 | Gilbert | ................... | B62D 24/00 296/187.09 |
| 2015/0130224 A1* | 5/2015 | Donabedian | ........... | B62D 25/16 296/198 |

FOREIGN PATENT DOCUMENTS

| | | |
|---|---|---|
| DE | 102012004682 A1 | 9/2013 |
| EP | 0980815 A1 | 2/2000 |
| GB | 2482953 A | 2/2012 |
| WO | 2015025781 A1 | 2/2015 |

OTHER PUBLICATIONS

Intellectual Property Office, Search Report for United Kingdom Patent Application No. GB1608697.7 dated Nov. 21, 2016.

\* cited by examiner

MOTOR VEHICLE BODY

CROSS-REFERENCE TO RELATED APPLICATION

This application claims priority to German Patent Application No. 102015007453.9, filed Jun. 5, 2015, which is incorporated herein by reference in its entirety.

TECHNICAL FIELD

The present disclosure pertains to a motor vehicle body having a floor structure and a superstructure arranged thereon. In a further aspect, the present disclosure furthermore relates to a vehicle with a corresponding motor vehicle body.

BACKGROUND

In collision scenarios and crash tests for a laterally offset front-end collision, for example a collision of the vehicle with a comparatively solid barrier of low structure, intrusion of a front wheel that directly impacts the barrier, into the passenger cell, which is located behind in travelling direction, should be minimized.

A protective device for a body of a passenger car which address these scenarios is disclosed in DE 10 2012 004 682 A1. A support element for supporting the vehicle wheel is provided in vehicle longitudinal direction behind a vehicle wheel. The support element includes at least one support surface running from the front inside towards the back outside. The vehicle wheel upon its backward displacement is deflectable in vehicle transverse direction to the outside. Such a configuration with a support surface which extends obliquely in vehicle longitudinal direction and vehicle transverse direction however requires a comparatively large installation space, in particular in vehicle longitudinal direction, Such approaches are therefore likely to be exclusively suitable for an engine that is installed in longitudinal direction combined with a rear-wheel drive, which makes possible displacing the axle forward without problems, so that between the front axle and the support element on the body side adequate installation space is available.

For motor vehicles with front-wheel drive and with an engine that is typically installed in vehicle transverse direction such a configuration, because of the confined space conditions between the front end of the sill of a floor structure and the front axle, is difficult to realize.

SUMMARY

The present disclosure provides a motor vehicle body that is improved insofar as space-saving in a manner which provides a deflection of a vehicle wheel that is directed outward in vehicle transverse direction upon its backward displacement due to a collision. In addition, the motor vehicle body that is improved insofar is to be a particularly compact design and by an improved structural stiffness and mechanical strength. The motor vehicle body includes a floor structure and a superstructure arranged thereon. The floor structure includes at least one side member. The superstructure includes at least one hinge pillar adjoining the floor structure. In the transition region of floor structure and hinge pillar, a reinforcing element is provided, which is structurally connected with a first end portion to the floor structure and which is structurally connected to the superstructure with a second end portion located opposite.

The floor structure preferably includes at least two side members, which are spaced from one another in vehicle transverse direction and a floor panel that is arranged on the side members. The superstructure includes at least one hinge pillar adjoining the floor structure, which preferably extends in a downward-directed extension of a front A-pillar of the side wall structure of the motor vehicle body.

By way of the hinge pillar, the A-pillar is preferably connected to the floor structure. For structurally reinforcing the connection of the floor structure and superstructure, the reinforcing element is provided, which is arranged in the transition region of floor structure and hinge pillar. The reinforcing element includes a first end portion, which is connected to the floor structure. Located opposite and at an end facing away from the first end portion, the reinforcing element includes a second end portion which is structurally connected to the superstructure of the motor vehicle body.

The reinforcing element functions as brace or guide plate. Because of its arrangement on the one hand on the floor structure and on the other hand on the superstructure of the motor vehicle body, it can contribute to a deflection, which in vehicle transverse direction (y) is directed to the outside, of a front wheel located in travelling direction in front of the reinforcing element in the case of a backward displacement of the front wheel due to a collision. In addition, the reinforcing element constitutes a structural reinforcement in the transition region between floor structure and superstructure, so that the strength and the structural integrity of the motor vehicle body in that transition region can be advantageously increased.

Because of its geometrical shape and its profile and because of the connection of its end portions located opposite to the floor structure and the superstructure, the reinforcing element makes available a double function. On the one hand, it can bring about a displacement which is specifically directed towards the outside of a motor vehicle wheel which moves towards the floor structure in vehicle longitudinal direction due to a collision. On the other hand, the reinforcing element prevents tearing-open or local breaking-apart of the motor vehicle body in the transition region between floor structure and superstructure, in particular at the foot of a hinge pillar adjoining the front end of a longitudinally extended sill, for example in the region of a rear end of a wheel housing and in the region of a lateral end portion of a front wall, which separates the passenger cell from the engine compartment locating in travelling direction in front of the former.

According to a further configuration, the second end portion of the reinforcing element is connected to a lower end portion of the hinge pillar. The reinforcing element insofar extends from the foot of the hinge pillar to the floor structure. The reinforcing element in this case extends at least in portions with a directional component in vehicle transverse direction (y) so that it functions as a kind of impact slope for a front wheel being displaced backwards. Through the direct connection of the second end portion of the reinforcing element with the hinge pillar, the foot of the hinge pillar can in particular be secured against a collision-based shifting relative to the floor structure.

According to a further configuration, the second end portion of the reinforcing element is connected to a side wall of the superstructure. Here, alternatively to the connection on the side wall, the second end portion can also be exclusively connected to the side wall of the superstructure. However it is also conceivable that the hinge pillar, the side wall and the second end portion of the reinforcing element overlap one another, thus are connected to one another in a common node or overlap region. Insofar, the reinforcing element on the one hand can provide an additional fixing of the side wall relative to the floor structure and furthermore the reinforcing element can also contribute to an improved joint of hinge pillar and side wall, namely in particular when side wall, hinge pillar and second end portion of the reinforcing element overlap and abut one another and are connected to one another in this abutment region.

According to a further configuration, the second or upper end portion of the reinforcing element is connected to a front end portion of a sill. The sill typically extends in vehicle longitudinal direction. The front end of the sill typically comes to lie adjoining the rear end portion of a wheel housing. By means of the reinforcing element, the sill can be separately and additionally connected to the floor structure and insofar provide an additional stiffening of the motor vehicle body in the transition region between a floor structure which with respect to the sill is located further inside in vehicle transverse direction (y) and the sill. The second end portion of the reinforcing element in this case can be exclusively connected to the front end portion of the sill. However it is also conceivable that the front end portion of the sill is connected to the hinge pillar and/or to the side wall of the superstructure.

The front end portion of the sill, the side wall of the superstructure and the hinge pillar are preferably arranged adjacent to or overlapping with regions relative to one another. The reinforcing element is structurally connected exactly in that overlap region both to the sill, to the side wall and also to the hinge pillar. Insofar, the reinforcing element provides an improved and reinforced connection between floor structure, sill, side wall or hinge pillar and also contributes to the connection as well as mutual reinforcement of hinge pillar, side wall and sill. Added to this is the deflection function of the reinforcing element which in vehicle transverse direction (y) is directed towards the outside, which is due in particular through the concrete shaping and through the geometrical profile of the reinforcing element.

According to a further configuration, the lower end portion of the reinforcing element is connected to a reinforcing plate or a torque box. The reinforcing plate or the torque box in this case connects the side member of the floor structure to a sill of the motor vehicle body. The sill in this case belongs to the superstructure of the motor vehicle body, while the side member which likewise predominantly extends in vehicle longitudinal direction belongs to the floor structure. The torque box may have a closed hollow profile which in vehicle transverse direction extends between the side member located inside and the sill located outside. The torque box can be closed off towards the top by the floor panel. Towards the front and towards the back, the torque box can be closed off by the already mentioned reinforcing plate, which reinforcing plate, just like the torque box itself, also extends in vehicle transverse direction between the side member and the sill. Sill and side member are structure connected to one another via the torque box or via the at least one reinforcing plate.

In an assembly position on the motor vehicle body, the first and second end portions of the reinforcing element need not necessarily be arranged at different height with respect to the vehicle vertical direction. It is conceivable, in particular, that lower and second end portion of the reinforcing element, based on the motor vehicle vertical axis, are approximately located at the same height. The first end portion then typically functions as end portion located inside or inner end portion, while the upper or second end portion of the reinforcing element then typically functions as outer end portion.

By connecting the first or inner end portion of the reinforcing element to the mentioned reinforcing plate or to the torque box, a direct or indirect connection with load-carrying components of the floor structure is provided. In this manner, a particularly strong and structure-reinforcing arrangement of the reinforcing element can be realized in the transition region of floor structure and superstructure.

According to a further configuration, a side of the reinforcing plate, which in travelling direction of the motor vehicle faces towards the front or a corresponding side of the torque box, is connected to the first end portion of the reinforcing element. Such a connection enables configuring the reinforcing element free of torsion, as a result of which a relatively simple production of the reinforcing element and a particularly simple and durable arrangement of the reinforcing element in the transition region of floor structure and superstructure can be provided.

According to an alternative configuration, a side of the reinforcing plate or of the torque box facing downwards is connected to the first end portion of the reinforcing element. Such an arrangement is provided in particular when for example a side of the reinforcing plate or of the torque box facing towards the front is not accessible or only with difficulty so.

According to a further configuration, the reinforcing element extends from a first end portion located within a wheel housing of the motor vehicle body to a region of a hinge pillar, a sill or a side wall located in travelling direction behind the wheel housing. Insofar, the reinforcing element can extend at least in portions from the lower and rear end of a front wheel housing from the front inside to the rear outside, so that it provides the function of an impact slope directed towards the back and towards the outside for a front wheel that is displaced backwards for example in the event of a collision.

By being separately connected on the one hand to the floor structure and on the other hand to the superstructure, the reinforcing element can additionally structurally reinforce that node of the motor vehicle body, in which the hinge pillar, the side wall, the sill, a front wall and a reinforcing plate or a torque box adjoin one another.

According to a further configuration, the second end portion of the reinforcing element, based on the vehicle transverse direction, abuts the hinge pillar, the sill or the side wall on the outside. The reinforcing plate, seen in vehicle transverse direction, may come to lie for example behind the hinge pillar and the side wall. An arrangement located outside of the reinforcing element on the hinge pillar, on the sill or on the side wall makes possible in particular a subsequent assembly of the reinforcing element, for example after the body has passed through a painting process. A connection of the reinforcing element on the outside is advantageous for the accessibility when attaching the reinforcing element to the superstructure or to the floor structure.

According to a further configuration, the reinforcing element includes an arched curvature portion, which the reinforcing element encloses or engages over an end portion of the hinge pillar located in the front in travelling direction. The arched curvature portion makes possible engaging over or spanning the front end portion of the pillar without bend, so that the reinforcing element ultimately can be attached to the superstructure in vehicle transverse direction (y). A lateral attachment of the reinforcing element on the hinge pillar, on the sill or one the side wall is particularly suitable for the transmission of any loads acting on the reinforcing element in longitudinal direction.

According to a further configuration, the reinforcing element has a linear band portion, which extends from an end portion of the hinge pillar located in travelling direction at the front to the floor structure. Typically, the band portion substantially extends linearly between the torque box or the reinforcing plate which substantially extends in vehicle transverse direction (y) between sill and side member, and the side wall structure of the motor vehicle body, which, adjoining the front wheel housing, is typically formed by the hinge pillar, the side wall and if applicable also by the sill.

The linear band portion can act as a type of tie member to counteract the body breaking apart in the node. At the same time, the linear band portion functions as a kind of barrier which can bring about a deflection directed in vehicle transverse direction towards the outside of a front wheel being displaced backwards for example due to a collision.

According to a further configuration of the motor vehicle body, the reinforcing element includes a fastening flange on at least one of its upper or first end portion, which is fastened on the superstructure or on the floor structure by at least one fastening element. Typically, both end portions, namely first and second end portion, each include a fastening flange, with which the reinforcing element abuts, preferably over the full area, components of the motor vehicle body adjoining thereon, thus the superstructure or the floor structure in the region of the respective fastening flange.

As fastening element, threaded fasteners are provided, which can provide a relative strong and durable connection between the reinforcing element, the floor structure and the superstructure. The use of particular fastening elements makes it possible to arrange the reinforcing element subsequently, i.e. following completion of the welded body in white and following the passing-through of a painting process on the motor vehicle body. It is possible insofar without problems to merely provide the reinforcing element on the motor vehicle body to suit demands for fulfilling national or regional crash test requirements.

According to a further configuration, the reinforcing element includes at least one structure-reinforcing stamping. The stamping(s) in this case can be provided in different locations of the reinforcing element. At least one structure-reinforcing stamping may be provided in the region of the arched curvature portion of the reinforcing element and/or at least one further structure-reinforcing stamping may be provided in the region of the linear band portion of the reinforcing element. In this way, the respective portions of the reinforcing element can be structurally reinforced separately, which can locally improve the mechanical loadability and the stiffness and strength of the reinforcing element.

According to a further configuration, the reinforcing element extends from its first end portion against the travelling direction in vehicle transverse direction towards the outside. Insofar, it makes available an impact slope or an outwardly directed ramp for a front wheel which is displaced backwards for example due to a collision.

Insofar, it is provided, the reinforcing element, based on the vehicle vertical direction (z), is arranged at a height of a vehicle front axle. Insofar, it is located on the "equator" of the front wheel so that in the instance of a backward displacement of the front wheel against the travelling direction a rear portion of the front wheel located against the travelling direction initially or exclusively comes into contact with the reinforcing element, as a result of which a deflection of the same which is directed towards the outside in vehicle transverse direction (y) can be favored to a particularly high degree.

The outwardly directed deflection of the front wheel with the help of the reinforcing element prevents the front wheel from entering the motor vehicle body located in travelling direction behind the same. A front-end intrusion of the passenger cell by the front wheel which is otherwise accompanied by this can be effectively prevented in this way. Insofar, the motor vehicle body provided here and equipped with the reinforcing element also provides an improved occupant protection.

The reinforcing element is typically configured as a metal component. It can be produced for example from a steel plate. Alternatively it is conceivable that the reinforcing element is configured as a forged metal part or a metal casting and insofar fulfills maximum strength requirements.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
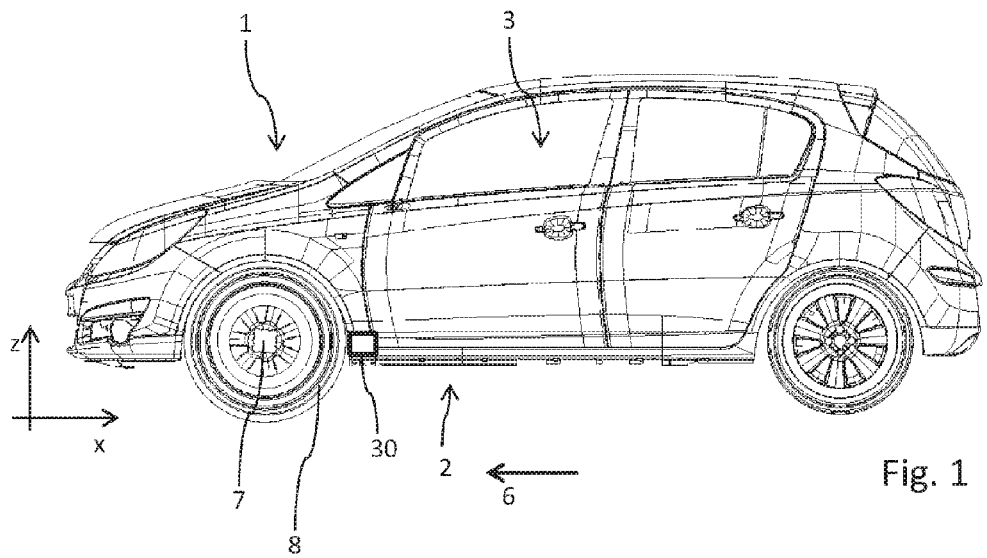
FIG. 1 is a schematic lateral view of a motor vehicle equipped as passenger car.

The motor vehicle 1 schematically shown in FIG. 1 includes a self-supporting motor vehicle body 2 with a passenger cell 3. The motor vehicle body 2 includes a floor structure 4, which in this case is not shown separately. The floor structure 4 includes a side member 22 extending in vehicle longitudinal direction, such as is schematically shown for example in FIG. 4. The side member 22, with respect to a sill 16 on the edge side which likewise extends in vehicle longitudinal direction, is arranged based on the vehicle transverse direction (y) offset towards the inside. The floor structure 4 in that region below the passenger cell 3 furthermore includes at least one floor panel 28, which forms the floor of the passenger cell 3.

The motor vehicle body 2, furthermore, includes a superstructure 5 in the region of the passenger cell 3, which includes all components which are located above the floor structure 4. The superstructure 5 for example includes a hinge pillar 14 which in FIG. 3 substantially extends vertically upwards with its foot, a side wall 18 and a sill 16 extending in vehicle longitudinal direction (x), As shown in FIG. 4, a torque box 26 extends between the sill 16 and the side member 22, which is delimited towards the front, in travelling direction 6, by a reinforcing plate 24.

Figure 3:
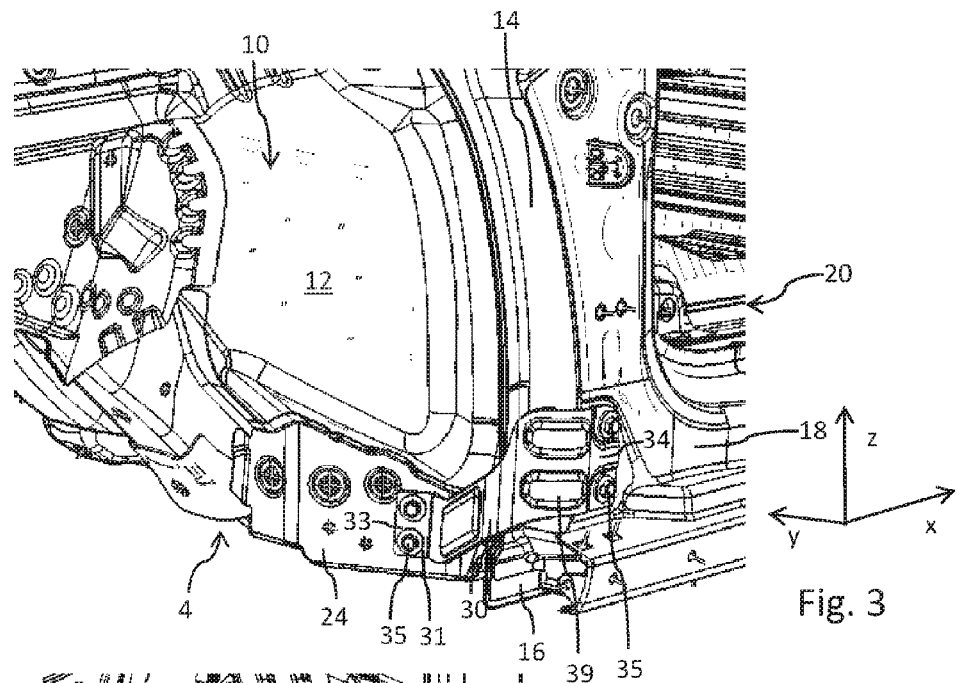
FIG. 3 is an enlarged representation of the motor vehicle body in the form of an extract according to FIG. 1 at the rear lower of the left front wheel housing.
Figure 4:
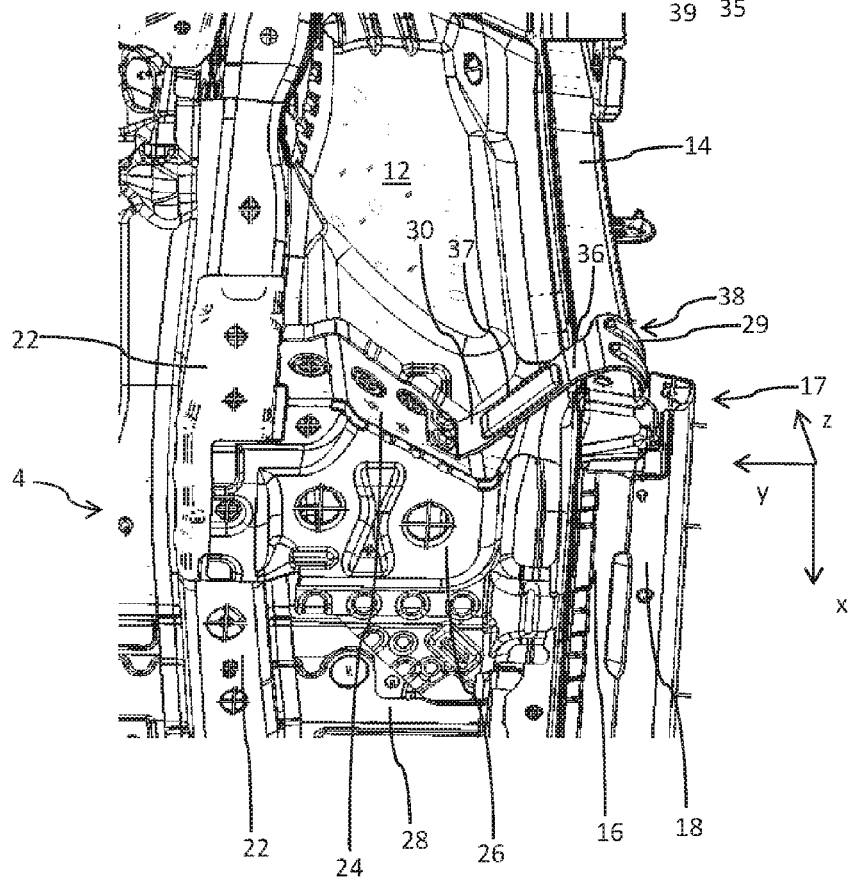
FIG. 4 is a perspective representation of the extract according to FIG. 3, however viewed obliquely from the bottom.

The reinforcing plate 24, which is shown in FIG. 3 from the front, extends in a plane which coincides with the vehicle vertical axis (z). it additionally extends diagonally in the vehicle longitudinal direction (x). It approximately follows the contour of the wheel housing 10 located above in vehicle vertical direction (z). A portion of the reinforcing plate 24 located inside in vehicle transverse direction, which from the outside adjoins the side member 22 located inside, lies in travelling direction 6 slightly in front of the end portion of the reinforcing plate 24 which is located opposite and in connection with the sill 16.

Figure 7:
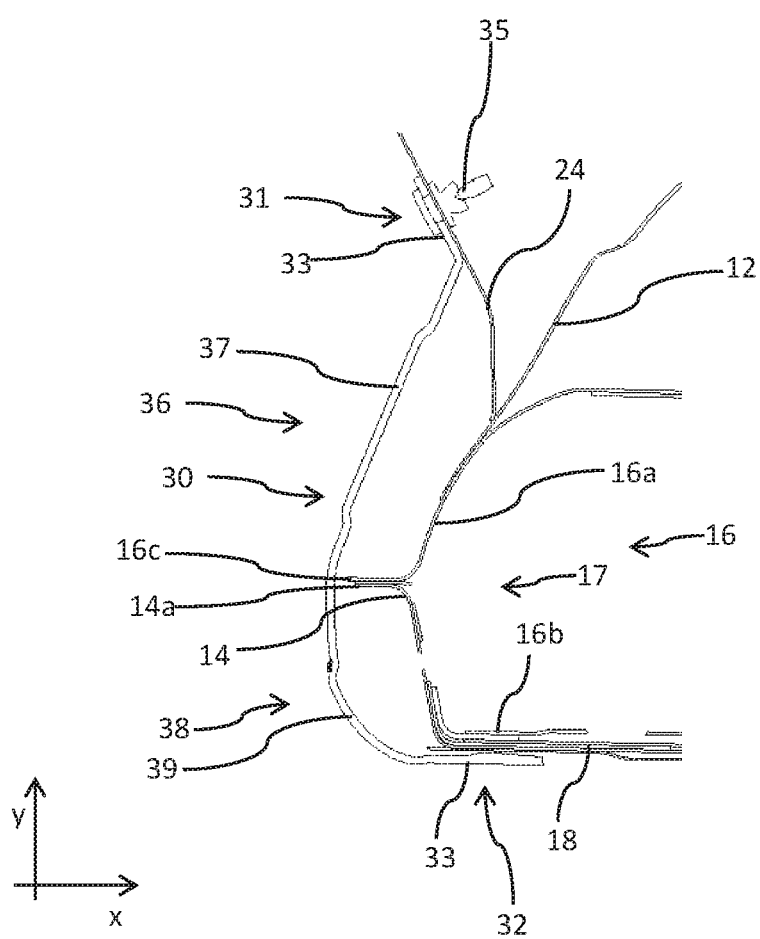
FIG. 7 is a cross section through the arrangement according to FIG. 6 in a cross-sectional plane formed by vehicle longitudinal direction (x) and vehicle transverse direction (y).

A lateral portion of a front wall 12 that is arched corresponding to the contour of the wheel housing 10 extends above the torque box 26. The front wall 12 is arranged towards the outside in its lower region at least partially overlapping a front end 17 of a sill 16, as is schematically shown in FIG. 7. Here, the sill 16 includes a sill inner plate 16a and a sill outer plate 16b. The sill inner plate 16a in this case has a flange portion 16c at its front end which projects forward in travelling direction 6, which flange portion 16c comes to lie overlapping a corresponding flange portion 14a of the hinge pillar 14.

Figure 2:
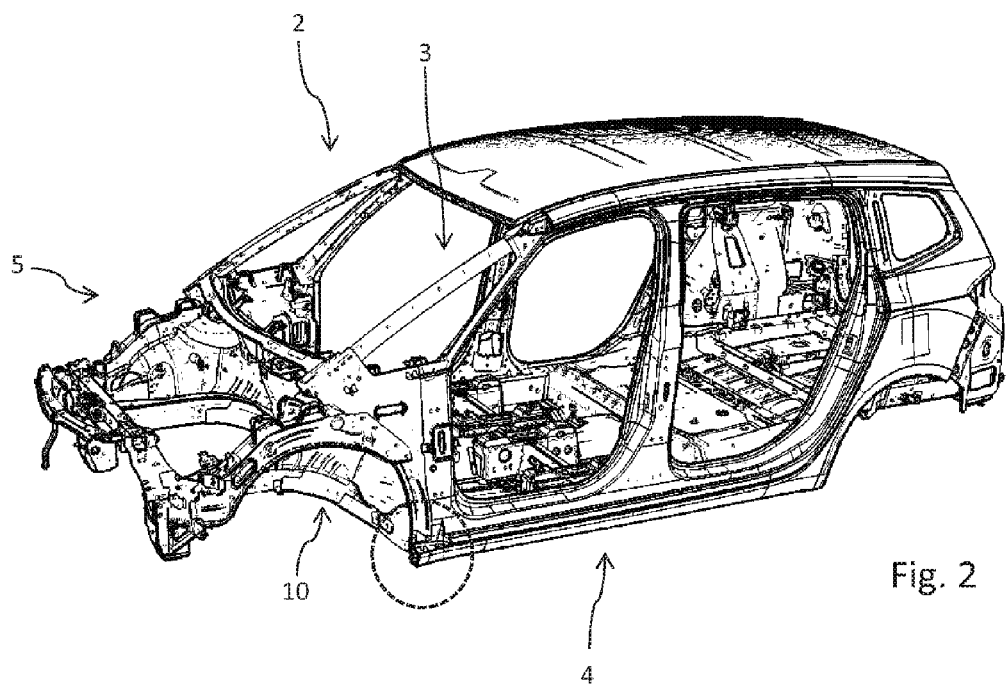
FIG. 2 is a perspective schematic representation of a motor vehicle body.

The side wall 18 of the superstructure 5 adjoins the end of the hinge pillar 14 which adjoins in vehicle transverse direction (y) to the outside. In FIG. 2, 3 as well as 5 and 6 it is evident that the side wall 18 delimits a door clearance 20 for the front door of the superstructure 5.

Figure 5:
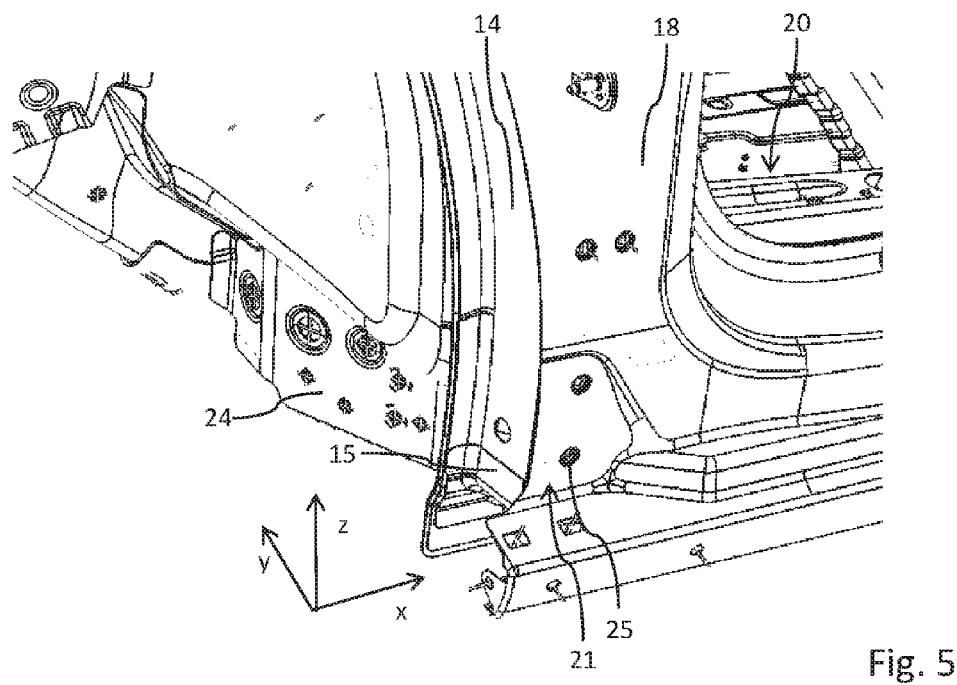
FIG. 5 is a further representation of the transition region from the floor structure and superstructure in the region of the foot of a left front hinge pillar prior to attaching the reinforcing element.
Figure 6:
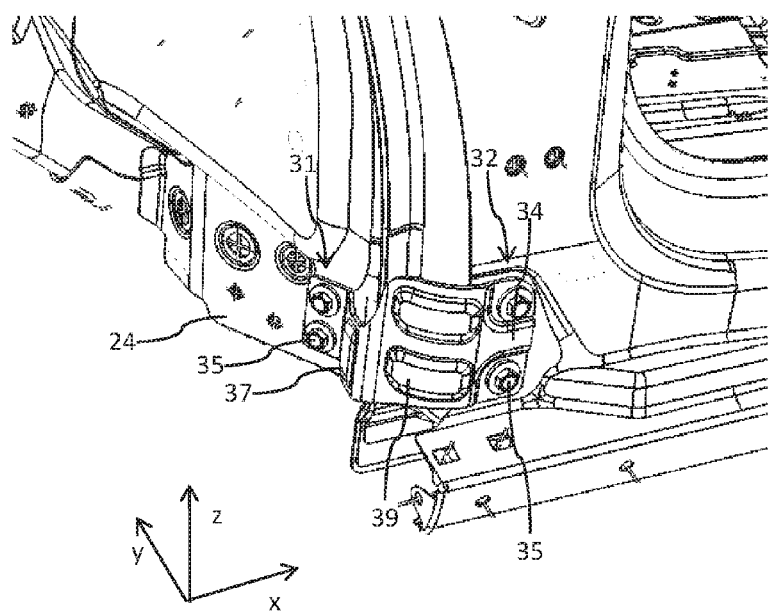
FIG. 6 shows the region according to FIG. 5, however with a reinforcing element arranged hereon.

In FIG. 5, the superstructure or the arrangement of the individual further components of the superstructure 5 which are arranged overlapping the lower end portion 15 of the hinge pillar 14, namely the sill 16 of the side wall 18 is shown. Here, an overlap region 21 is formed, in which the sill 16, the side wall 18 as well as the hinge pillar 14 come to lie overlapping one another. In that region, as shown in FIG. 5, individual screw holes 25 are provided, which are designed for receiving fastening elements 35 configured as threaded fasteners.

In that overlap region 21, a front end portion 17 of the sill 16 as well as a lower end portion 15 of the hinge pillar 14 as well as a lower and front end portion of the side wall 18 which is not designated any further, come to overlap one another. That overlap region 21 in this case serves for the arrangement of a second end portion 32 of a reinforcing element 30, which, with a first end portion 31 that is located opposite, is fastened to the floor structure 4, in this case to the torque box 26 or the reinforcing plate 24 of the same.

The reinforcing element 30 includes a brace-like or barrier-like configuration. On its first end portion 31 it has a fastening flange 33, which abuts the outside and the side of the reinforcing plate 24 located in travelling direction with almost the full surface area. The second end portion 32 is likewise provided with a fastening flange 33, by means of which the reinforcing element 30 abuts in the overlap region 21 that was already described with reference to FIG. 5, where it can be structurally connected to the superstructure 5 by means of two fastening elements 35, in this case in the form of threaded fasteners.

In the representation according to FIG. 4 it is evident that the reinforcing element 30 has an elongated band portion 36, which extends from the first end portion 31 located inside as far as to approximately the end portion 13 of the hinge pillar 14 located in travelling direction at the front. Adjoining thereon, the band portion 36 merges into an arched curvature portion 38, and on the other end leads into the second upper or exterior end portion 32. In the region of the band portion 36, a structure-reinforcing stamping 37 is provided here, while in the region of the curvature portion 38 of the reinforcing element 30, two arched stampings 39 which are vertically spaced from one another are provided.

By means of the stampings 37, the individual portions, namely band portion 36 and curvature portion 38 can each be structurally reinforced separately. The band portion 36 partially extends as a tie member between the reinforcing plate 24 or the torque box 26 and the hinge pillar 14. The arched curvature portion 38 of the reinforcing element 30 engages over or encloses in the process the lower end portion 15 of the hinge pillar 14 which in travelling direction is located at the front, as is evident for example from FIGS. 3 and 7.

FIG. 1 furthermore shows the position of the reinforcing element 30 with respect to the front axle 7. The reinforcing element 30, based on the vehicle vertical axis (z), is located approximately at the height of the front axle 7, so that the front wheel 8 for example in the case of a backward displacement due to a collision comes to bear against the reinforcing element 30 and is subjected to a deflection that is directed to the outside by way of the reinforcing element 30.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle body comprising:
a floor structure having at least one side member that extends in a vehicle longitudinal direction of the vehicle body, and having a torque box;
a floor panel supported on the side member;
a superstructure arranged on the floor structure, wherein the superstructure includes a sill that extends in the vehicle longitudinal direction and at least one hinge pillar that has a lower end portion adjoining the sill, wherein the torque box is connected to both the sill and the side member; and
a reinforcing element provided in a transition region of the floor structure and the superstructure, the reinforcing element having a first end portion structurally connected directly to the floor structure at the torque box and a second end portion opposite the first end portion structurally connected directly to the superstructure at the lower end portion, wherein the reinforcing element ends, in a vehicle transverse direction of the vehicle body, at each of the first end portion and the second end portion.

2. The motor vehicle body according to claim 1, wherein an upper end portion of the reinforcing element is fixed to the lower end portion of the hinge pillar.

3. The motor vehicle body according to claim 1, wherein the first end portion of the reinforcing element is spaced away from the side member so that the reinforcing element does not contact the side member.

4. The motor vehicle body according to claim 1, wherein the sill has a front end portion connected to the second end portion of the reinforcing element.

5. The motor vehicle body according to claim 4, comprising a reinforcing plate forming a part of, and closing, the torque box, wherein the first end portion of the reinforcing element is connected directly to the reinforcing plate.

6. The motor vehicle body according to claim 5, wherein a side formed on the reinforcing plate, which in a travelling direction of the motor vehicle faces towards a front, is connected to the first end portion of the reinforcing element.

7. The motor vehicle body according to claim 1, wherein the lower end portion includes a side wall facing outward from the vehicle body, wherein the reinforcing element extends from the first end portion that is located within a wheel housing to a region on the side wall, which is located outside the wheel housing and in a travelling direction behind the wheel housing, wherein the reinforcing element includes a fastening flange at the second end portion that is fixed to the side wall, and the reinforcing element includes a curvature portion adjacent the fastening flange that extends from inside the wheel housing to outside the wheel housing so that the reinforcing element curves around the lower end portion of the hinge pillar to the side wall.

8. The motor vehicle body according to claim 7, wherein the second end portion of the reinforcing element with respect to the vehicle transverse direction abuts the side wall on its outside.

9. The motor vehicle body according to claim 1, wherein the reinforcing element comprises an arched curvature portion, which encloses the lower end portion of the hinge pillar.

10. The motor vehicle body according to claim 1, wherein the reinforcing element comprises a linear band portion, which extends from the lower end portion of the hinge pillar towards the floor structure.

11. The motor vehicle body according to claim 1, further comprising a fastening flange formed on at least one of the first or second end portion of the reinforcing element, and at least one fastening element extending through the fastening flange to secure the reinforcing element to at least one of the superstructure or the floor structure.

12. The motor vehicle body according to claim 1, wherein the reinforcing element comprises at least one structure-reinforcing stamping.

13. The motor vehicle body according to claim 1, wherein the reinforcing element extends from the first end portion against a forward travelling direction of the motor vehicle and in the vehicle transverse direction toward an outside of the motor vehicle.

14. The motor vehicle body according to claim 1, wherein the reinforcing element is arranged at a height of a vehicle front axle with respect to a vehicle vertical direction.

15. A motor vehicle with a motor vehicle body according to claim 1.

16. A motor vehicle body comprising:
a floor structure having a side member that extends in a vehicle longitudinal direction of the vehicle body;
a superstructure arranged on the floor structure and having a sill that extends in the vehicle longitudinal direction, the sill disposed, in a vehicle transverse direction of the vehicle body, at a location offset outward from the side member, the superstructure having a hinge pillar that has a lower end portion adjoining the sill at an overlap region;
a torque box that extends between, and is connected to, both the sill and the side member; and
a reinforcing element that extends in the vehicle transverse direction from a first end portion to a second end portion opposite the first end portion, wherein the first end portion is structurally connected directly to the torque box, and the second end portion is structurally connected directly to the overlap region, wherein the first end portion of the reinforcing element is spaced away from the side member so that the reinforcing element is not connected directly to the side member.

17. A motor vehicle body comprising:
a floor structure having a side member that extends in a vehicle longitudinal direction of the vehicle body;
a superstructure arranged on the floor structure and having a sill that extends in the vehicle longitudinal direction, the sill disposed, in a vehicle transverse direction of the vehicle body, at a location offset outward from the side member, the superstructure having a hinge pillar that has a lower end portion adjoining the sill;
a torque box that extends between, and is connected to, both the sill and the side member; and
a reinforcing element that extends in the vehicle transverse direction from a first end portion to a second end portion opposite the first end portion, wherein the first end portion is structurally connected directly to the torque box, and the second end portion is structurally connected directly to the lower end portion, wherein the first end portion of the reinforcing element is spaced away from the side member so that the reinforcing element is not connected directly to the side member, wherein the lower end portion includes a side wall facing outward, in the vehicle transverse direction, from the vehicle body, wherein the reinforcing element includes a fastening flange at the second end portion that is fixed to the side wall, and the reinforcing element includes a curvature portion adjacent the fastening flange that curves around the lower end portion of the hinge pillar to the side wall.

\* \* \* \* \*